United States Patent [19]

Gervase

[11] 4,031,120

[45] June 21, 1977

[54] ISOCYANATOSILANE ADDUCTS

[75] Inventor: Nicholas J. Gervase, Erie, Pa.

[73] Assignee: Lord Corporation, Erie, Pa.

[22] Filed: May 7, 1976

[21] Appl. No.: 684,417

Related U.S. Application Data

[62] Division of Ser. No. 506,829, Sept. 17, 1974.

[52] U.S. Cl. .................. 260/448.8 R; 106/287 SB; 428/420; 428/428
[51] Int. Cl.$^2$ ...................... C07F 7/10; C07F 7/18
[58] Field of Search ............................ 260/448.8 R

[56] References Cited

UNITED STATES PATENTS

| | | | |
|---|---|---|---|
| 3,426,057 | 2/1969 | Kanner | 260/448.8 R X |
| 3,726,907 | 4/1973 | Tesoro et al. | 260/448.8 R |
| 3,895,043 | 7/1975 | Wagner et al. | 260/448.8 R |
| 3,956,353 | 5/1976 | Plueddemann | 260/448.8 R |

*Primary Examiner*—Paul F. Shaver
*Attorney, Agent, or Firm*—John A. Gazewood

[57] ABSTRACT

Compositions comprising at least one isocyanate-functional organosilane, preferably in combination with at least one polyisocyanate, and, optimally, at least one aromatic nitroso compound have been found to be unexpectedly effective as storage-stable, single-package, one-coat adhesive systems for bonding a variety of elastomeric materials to themselves and other solid substrates, such as metal, fabric, ceramic, and the like substrates.

13 Claims, No Drawings

ISOCYANATOSILANE ADDUCTS

This is a division of application Ser. No. 506,829, filed Sept. 17, 1974.

This invention relates to adhesive compositions. More particularly, the invention relates to adhesive compositions suitable for bonding elastomeric materials, especially vulcanizable elastomeric materials, at elevated temperatures to inorganic substrates and to other substrates including themselves.

It is well-known to employ adhesive compositions for bonding elastomeric materials to substrates, including elastomeric, fabric, metal, and other solid substrates. In the as yet unconsummated search for the ideal all-purpose adhesive, there have been developed a variety of adhesive compositions which have been utilized with varying degrees of success in bonding elastomeric materials to themselves or to other substrates to form laminates and composite articles. As a general rule, the known adhesives which have been effective as single-coat rubber-to-metal bonding agents are limited with respect to the type of elastomer to be bonded. That is to say, an adhesive which is capable of providing an acceptable bond with butadiene/styrene elastomers may be unsatisfactory with ethylene/propylene/non-conjugated diene terpolymer (EPD,) elastomer or polyisobutylene/isoprene elastomer. This lack of versatility which is characteristic of the general class of one-coat adhesive systems can be partially alleviated by the use of two-coat adhesive systems which utilize a primer coat applied over the metal substrate and a cover coat (which adheres well to the elastomer) interspersed between the elastomer and the primer. In addition to the problem of versatility, both the one-coat and two-coat adhesive systems suffer from one or more other disadvantages, including a general inability to afford optimum adhesion, particularly at elevated service temperatures; poor storage stability at room and/or elevated temperatures; poor resistance to prebake; and the resistance of the adhesive bond to environmental conditions such as solvents, moisture and the like, is too often poorer than is normally desired in many commerical applications. Thus, there remains a need for more effective adhesive formulations, particularly one-coat adhesive formulations which can be employed in bonding elastomeric materials to various substrates including themselves, which are shelf-stable for extended periods prior to use, which can be employed with a variety of elastomeric materials, and which are resistant to degradation from environmental factors.

It is an object of this invention to provide adhesive compositions for bonding a variety of elastomers at elevated temperatures to various substrates, particularly metal substrates.

It is another object of this invention to provide adhesive compositions which afford strong elastomer-substrate adhesive bonds and which adhesive bonds exhibit high environmental resistance.

These and other objects, aspects, and advantages of the invention, including a method for bonding elastomeric materials to substrates, and adhesively-joined elastomer-substrate composites, will be readily apparent from a consideration of the specification and the appended claims.

In accordance with the present invention, it has been discovered that compositions comprising at least one isocyanato organosilane, preferably in combination with at least one polyisocyanate characterized by the presence of at least two free isocyanate groups, are unexpectedly effective as adhesive materials for bonding a variety of elastomers, particularly vulcanizable elastomers, to inorganic substrates. The isocyanato functional organosilanes, which will be referred to hereafter as isocyanatosilanes, which are suitable for use in the present invention, can be broadly described as those compounds capable of undergoing both the hydrolytic reactions typical of alkyl esters of silicic acid and the reactions with active hydrogen-containing compounds typical of isocyanates.

In addition to affording strong adhesive bonds with a variety of elastomers, the compositions of the invention improve the environmental resistance of the bonded assembly. It has also been discovered that the incorporation of one or more aromatic nitroso compounds can improve the strength of the adhesive bond and/or improve the environmental resistance, and can further extend the versatility of the adhesive compositions. It has further been discovered that the inclusion of one or more polymeric film-forming adjuncts can provide further improvements, particularly in relation to film properties. The compositions of the invention provide strong bonds which is highly desired in many commercial applications. A particularly unexpected feature of the invention is the capability of the herein described compositions to function as single-package, one-coat adhesive systems which afford strong rubber-to-metal adhesive bonds having an improved resistance to environmental attack. In addition, the preferred adhesive compositions of the invention are further characterized by their stability at ambient temperatures during storage and handling.

The reason for the improvement in stability is not fully understood. Generally, adhesive compositions comprising free isocyanate-containing materials have a limited pot life, due to the high reactivity of the isocyanate group with water and other active hydrogen-containing compounds. The inclusion of aromatic nitroso compounds and/or polymeric film-forming adjuncts introduces impurities such as water and reactive oximes which would be expected to have a deleterious effect on stability, since such impurities tend to hydrolyze both the isocyanate and the silicic ester portions of the isocyanato organosilane and also react with the other components, e.g., through the free isocyanate groups of the free polyisocyanate, thereby leading to premature gelation of the adhesive compositions. It is hypothesized that the improvement in stability could be due to the acidic buffering which is inherent in the compositions of this invention due to any or all of the latent, i.e., free, acidity of the polyisocyanate component, an acidic contribution from random and dissociated free silicic acid groups, or an acidic contribution from the polymeric film-forming adjunct. This postulation is disclosed in U.S. Pat. No. 3,830,784, which is directed to improvements in shelf stability, i.e., storage and handling stability of rubber-to-metal bonding compositions containing free polyisocyanates. The same means of improving shelf stability taught under U.S. Pat. No. 3,830,784 may in fact be operative for the compositions of the present invention.

The isocyanatosilanes employed in the present invention are characterized by the presence of at least one free isocyanate moiety and at least two hydrolyzable groups according to the general formula

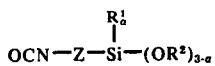

wherein
R[1] is a monovalent aliphatic, cycloaliphatic or aromatic radical having from 1 to 20 carbon atoms, and is preferably selected from the group consisting of alkyl radicals having from 1 to 4 carbon atoms, cycloalkyl radicals having from 4 to 7 ring carbon atoms, aryl radicals having 6, 10, or 14 nuclear carbon atoms, and such aryl radicals containing one or more substituent alkyl groups having from 1 to 4 carbon atoms;

R[2] is a monovalent aliphatic, cycloaliphatic or aromatic organic radical containing from 1 to 8 carbon atoms and is preferably selected from the group consisting of alkyl radicals having from 1 to 4 carbon atoms, $-R^3 - O - R^4$, and

where
R[3] is an alkylene group having from 1 to 4 carbon atoms and R[4] is an alkyl group having from 1 to 4 carbon atoms;
$a$ is zero or 1, and preferably is zero; and
Z is a divalent organic radical attached to the silicon atom via a carbon-silicon bond. The exact nature of the Z radical is not critical, i.e., the radical can have any configuration and combination of groupings that are compatible with the isocyanato groups. For example, the Z radical can be a hydrocarbon radical, or it can contain linkages such as ether, ureido, urethane, and thiourethane linkages. The Z radical can, of course, contain substitutent groups such as halogen which are compatible with the isocyanato groups.

Isocyanatosilanes which are preferably, but not exclusively so, employed in the practice of the invention are selected from the group consisting of (1) isocyanatosilanes having the general formula

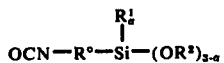

or (2) isocyanatosilane adducts of multifunction ogranosilanes and polyisocyanates, said adducts having as characteristic features at least one free isocyanate group and at least one silane grouping having the formula

it being understood that said free isocyanate group(s) and said silane grouping(s) are joined to each other through the residue of the polyisocyanate reactant. The isocyanatosilane adducts, i.e., the reaction products of multifunctional organosilanes and polyisocyanates, are presently preferred for forming adhesive compositions according to the invention. Such adducts are generally easier to prepare and are consequently more readily available than are isocyanatosilanes prepared directly from the more basic silane intermediates. (The more basic silane intermediates are for present purposes, assumed to be those with the highly reactive

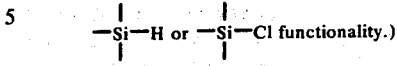

In the foregoing formulae,
R[1], R[2] and $a$ are as previously defined;
R[o] is selected from the group consisting of divalent hydrocarbon and halogenated hydrocarbon radicals having from 1 to 20, preferably 2 to 9, carbon atoms;
A is selected from the group consisting of $-O-$, $-S-$, $>N-$, and other groups containing an active hydrogen: and
R is a divalent aliphatic, cycloaliphatic, or aromatic radical having from 1 to 20 carbon atoms, and is preferably an alkylene radical having from 1 to 9 carbon atoms. Especially preferred are adducts in which A is $-O-$ or $H-N<$; R is an alkylene group having from 2 to 4 carbon atoms, $R_2$ is methyl, ethyl, methoxyethylene or methyl carbonyl, and $a$ is zero.

Isocyanatosilanes corresponding to the formula

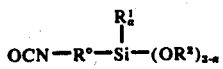

are known articles of commerce. Such compounds can be prepared, for example, by the pyrolysis of the corresponding carbamate. The carbamate can be prepared by effecting reaction between a silylorganohalide, a metal cyanate and an aliphatic monhydric alcohol in the presence of an aprotic solvent. Another method for preparing such compounds comprises effecting reaction between a silicon hydride and an olefinically unsaturated isocyanate, such as allyl isocyanate. Such isocyanatosilanes include, without limitation, trimethoxysilylpropylisocyanate, phenyldiethoxysilylpropylisocyanate, and methyldimethoxysilylbutylisocyanate.

The presently preferred isocyanatosilane adducts can be readily prepared by effecting reaction between a multifunctional organosilane and a polyisocyanate by adding the organosilane, preferably as a dilute solution, to the polyisocyanate, also preferably diluted, at a temperature in the range from about 10° to about 100° C, while agitating the mixture by a mechanical stirrer or similar device. While not essential, a suitable catalyst, such as dibutyltin dilaurate, can be employed. The reaction is essentially instantaneous, particularly when catalysts are employed, and is accompanied by a mild exotherm. It is essential that the amount of polyisocyanate present during the reaction be such as to ensure obtaining an adduct having at least one free isocyanate group. Thus it will be appreciated that the minimum amount, in molar equivalents of NCO, of polyisocyanate required to form the adducts of the invention is one molar equivalent of NCO in excess of the amount, in molar equivalents of NCO, required to react with all the active hydrogen of the silane reactant. If desired, the adduct can be separated from the reaction mixture by conventional means. However, it has been found advantageous to add the organosilane reactant to a sufficient excess of the polyisocyanate reactant to ensure complete reaction of the organosilane reactant to afford, on the one hand, an isocyanate adduct having at least one free isocyanate group and, on the other hand, a reaction mixture containing sufficient unreacted polyisocyanate to provide the requisite amount of isocyanate functionality, as will be set forth in greater detail, infra. In this manner, the isolation of the silane-isocyanate adduct from the reaction mixture and the subsequent addition of the adduct to free polyisocyanate can be dispensed with, thereby affording a significant economic advantage. This method, i.e., contacting the organosilane reactant with excess polyisocyanate reactant, has been found to be particularly advantageous in those instances wherein the adhesive compositions of the invention contain a polymeric film-former adjunct.

As noted, at present it is preferred to employ both the silane and the polyisocyanate in dilute form. Suitable solvents include aromatic hydrocarbon such as benzene, toluene, xylene, and the like; halogenated aromatic hydrocarbon such as monochlorobenzene, dichlorobenzene, and the like; halogenated aliphatic hydrocarbons, such as trichloroethylene, perchloroethylene, propylene dichloride, and the like; ketones, such as methyl isobutyl ketone, methyl ethyl ketone, and the like, ethers, and the like; including mixtures of such solvents/diluents. The degree of dilution is not critical. As long as it does not prohibit an adequate film thickness of the adhesive in the end application.

The multifunctional organosilane compounds which are suitable for use in the practice of the invention are characterized by the presence of a single organic chain containing at least one functional group having at least one extractable, i.e., active, hydrogen atom, such as an amino, mercapto, hydroxy, or other active hydrogen-containing functional group being connected to silicon through an organic group containing at least one carbon atom. Preferably, the functional group containing at least one active hydrogen atom is connected to the silicon atom by an organic group containing at least two interconnected carbon atoms.

More particularly, the multifunctional organosilane compounds which are suitable for use in the practice of the invention are selected from the group consisting of hydroxyorgano silanes having the formula

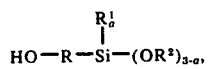

wherein
R is a divalent aliphatic, cycloaliphatic or aromatic radical having from 1 to 20 carbon atoms, and is preferably an alkylene radical having from 1 to 9, most preferably 2 to 4, carbon atoms;
$R^1$ is a monovalent aliphatic, cycloaliphatic or aromatic radical having from 1 to 20 carbon atoms, and is preferably selected from the group consisting of alkyl radicals having from 1 to 4 carbon atoms, cycloalkyl radicals having from 4 to 7 ring carbon atoms, and aryl radicals having 6, 10, or 14 nuclear carbon atoms, and including such aryl radicals containing one or more substituent alkyl groups having from 1 to 4 carbon atoms;
$R^2$ is a monovalent aliphatic, cycloaliphatic or aromatic organic radical containing from 1 to 8 carbon atoms, and is preferably selected from the group consisting of alkyl radicals having from 1 to 4 carbon atoms, $R^3$—O—$R^4$, and

where
$R^3$ is an alkylene group having from 1 to 4 carbon atoms and $R^4$ is an alkyl group having from 1 to 4 carbon atoms; and
a is zero or 1, preferably zero;
aminoorganosilane compounds having the characteristic formula

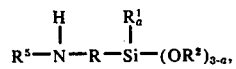

wherein
R, $R^1$, $R^2$ and a are as previously defined; and
$R^5$ is selected from the group consisting of hydrogen, monovalent aliphatic radicals having from 1 to 8 carbon atoms, monovalent cycloaliphatic radicals having from 4 to 7 ring carbon atoms, phenyl, alkaryl radicals having 6 nuclear carbon atoms and containing one or more substituent alkyl groups having from 1 to 4 carbon atoms, and —$R^6$—N-H—$R^7$, wherein $R^6$ is selected from the group consisting of divalent aliphatic, cycloaliphatic and aromatic radicals having from 1 to 20 carbons, there being preferably at least two carbon atoms separating any pair of nitrogen atoms, with $R^6$ being preferably an alkylene of 2 to 9 carbon atoms; and $R^7$ being the same as $R^5$ and preferably is hydrogen;
mercapto organosilane compounds having the characteristic formula

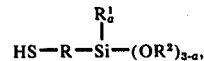

wherein
R, $R^1$, $R^2$ and 2 are as previously defined;
and other organosilane compounds having a single organic chain having from 1 to 20 carbon atoms, said chain having at least one extractable hydrogen atom, said extractable hydrogen atom preferably being attached to a functional group separated from the silicon atom by a chain of at least 3 interconnected carbon atoms.

The preferred organosilane compounds for use in the practice of the invention are aminoorganosilane compounds as herein described. It will be appreciated that both primary and secondary aminoorganosilane compounds, and also such compounds containing in their structure at least one primary amino grouping and one or more secondary amino groupings can be employed in forming the compositions of this invention. It is also possible to employ aminoorganosilane compounds containing one or more tertiary amino groupings providing such compounds contain also at least one primary or secondary amino grouping. At present, aminoorganosilane compounds characterized by the presence of at least one primary amino grouping are preferred.

Representative multifunctional organosilanes which are suitable for use in the practice of the invention include without limitation hydroxypropyltrimethoxysilane, hydroxypropyltriethoxysilane, hydroxybutyltrimethoxysilane, g-aminopropyltrimethoxysilane, g-aminopropyltriethoxysilane, methylaminopropyltrimethoxysilane, g-aminoproyltripropoxysilane, g-aminoisobutyltriethoxysilane, g-aminopropylmethyldiethoxysilane, g-aminopropylethyldiethoxysilane, g-aminopropylphenyldiethoxysilane d-aminobutyltriethoxysilane, d-aminobutylmethyldiethoxysilane, d-aminobutylethyldiethoxysilane, g-aminoisobutylmethyldiethoxysilane, N-methyl-g-aminopropyltriethoxysilane, N-phenyl-g-aminoisobutylmethyldiethoxysilane, N-ethyl-d-aminobutyltriethoxysilane N-g-aminopropyl-g-aminopropyltriethoxysilane, N-β-aminoethyl-g-aminosobutyltriethoxysilane, N-g-aminopropyl-aminobutyltriethoxysilane, N-aminohexyl-g-aminoisobutylmethyldiethoxysilane, methylaminopropyltriethoxysilane, g-mercaptopropyltrimethoxysilane, mercaptoethyltriethoxysilane, g-aminopropylmethoxydiethoxysilane, and the like.

The polyisocyanates which can be employed in the practice of the present invention can be any organic isocyanate having at least two free isocyanate groups. Included within the purview of suitable polyisocyanates are aliphatic, cycloaliphatic, and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention. These polyisocyanates can serve both as the free polyisocyanate component of the herein described compositions and as a starting material for the silane-polyisocyanate adduct component.

Particularly preferred polyisocyanates are the polyalkylene poly(aryleneisocyanates) having the formula

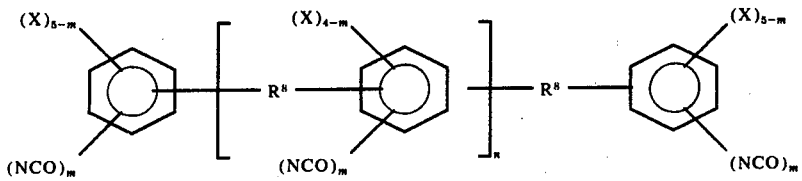

wherein
$R^8$ is a divalent organic radical, preferably a divalent aliphatic radical having from 1 to 8 carbon atoms, especially such radicals obtained by removing the carbonyl oxygen from an aldehyde or ketone, and preferably is methylene;
m is 1 or 2, and is preferably 1;
n is a digit having an average value in the range from zero to 15, preferably 0.1 to 4, and most preferably 0.3 to 1.8; and
X is selected from the group consisting of hydrogen, halogen, alkyl radicals having from 1 to 8 carbon atoms, and alkoxy radicals having from 1 to 8 carbon atoms, and preferably is hydrogen.

Suitable polyisocyanates include without limitation tolylene-2,4-diisocyanate, 2,2,4-trimethylhexamethylene-1,6-diisocyanate; hexamethylene-1,6-diisocyanate, diphenylmethane-4,4'-diisocyanate, triphenylmethane-4,4'4-triisocyanate, 3-isocyanatomethyl-3,5,5-trimethylcyclohexylisocyanate, polymethylene polyphenylisocyanate, m-phenylenediisocyanate, p-phenylenediisocyanate, 2,6-tolylene diisocyanate, 1,5-naphthalenediisocyanate, naphthalene-1,4-diisocyanate, diphenylene-4,4'-diisocyanate, 3,3'-bi-tolylene-4,4'-diisocyanate, ethylene diisocyanate, propylene-1,2-diisocyanate, butylene-2,3-diisocyanate, ethylidenediisocyanate, butylidenediisocyanate, xylylene-1,4-diisocyanate, xylylene-1,3-diisocyanate, methylcyclohexyldiisocyanate, cyclopentylene-1,3-diisocyanate, cyclohexylene-1,4-diisocyanate, 4,4'-methylene-bis(cyclohexylisocyanate), p-phenylene-2,2'-bis(ethylisocyanate), 4,4'-diphenylene ether-2,2'-bis(ethylisocyanate), tris(2,2',2''-ethylisocyanate benzene), 5-chloro-phenylene-1,3-bis(propyl-3-isocyanate), 5-methoxy-phenylene-1,3-bis(propyl-3-isocyanate), 5-cyanophenylene-1, 3-bis(propyl-3-isocyanate), 4-methyl-phenylene-1,3-bis(propyl-3-isocyanate), and the like. Other polyisocyanates which can be employed in the practice of the invention include the aromatic diisocyanate dimers, such as those described in U.S. Pat. No. 2,671,082. A particularly preferred dimer is the tolylene diisocyanate dimer having the formula

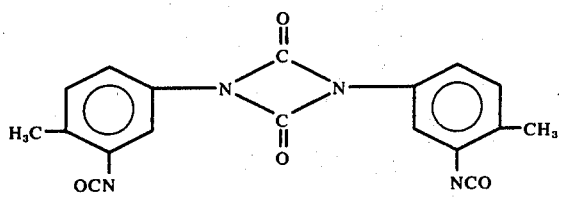

The aromatic nitroso compounds which are suitable for use in the practice of the present invention can be any aromatic hydrocarbon, such as benzenes, naphthalenes, anthracenes, biphenyls, and the like, containing at least two nitroso groups attached directly to non-adjacent ring carbon atoms. More particularly, such nitroso compounds are described as poly-C-nitroso aromatic compounds having from 1 to 3 aromatic nuclei, including fused aromatic nuclei, having from 2 to 6 nitroso groups attached directly to non-adjacent nuclear carbon atoms. The presently preferred poly-C-nitroso materials are the di-nitroso aromatic compounds, especially the dinitrosobenzenes and dinitrosonaphthalenes, such as the meta- or paradinitrosobenzenes and the meta- or paradinitrosonaphthalenes. The nuclear hydrogen atoms of the aromatic nucleus can be replaced by alkyl, alkoxyl, cycloalkyl, aryl, aralky, alkaryl, arylamine, arylnitroso, amino, halogen, and the like groups. The presence of such substituents on the aromatic nucleus has little effect on the activity of the poly-C-nitroso compounds in the present invention. As far as is presently known, there is no limitation as to the character of the substituent, and such substituents can be organic or inorganic in nature. Thus, where reference is made herein to poly-C-nitroso or di-C-nitroso "aromatic compound," "benzenes," or "naphthalenes," it will be understood to include both substituted and unsubstituted nitroso compounds, unless otherwise specified.

Particularly preferred poly-C-nitroso compounds are characterized by the formula

wherein
Ar is selected from the group consisting of phenylene and naphthalene;
$R^9$ is a monovalent organic radical selected from the group consisting of alkyl, cycloalkyl, aryl, aralkyl, alkaryl, arylamine and alkoxy radicals having from 1 to 20 carbon atoms, amino, or halogen, and is preferably an alkyl group having from 1 to 8 carbon atoms; and
p is zero, 1, 2, 3, or 4 and is preferably zero.

A partial non-limiting listing of suitable poly-C-nitroso compounds which are suitable for use in the practice of the invention include m-dinitrosobenzene, p-dinitrosobenzene, m-dinitrosonaphthalene, p-dinitrosonaphthalene, 2,5-dinitroso-p-cymene, 2-methyl-1,4-dinitrosobenzene, 2-methyl-5-chloro-1,4-dinitrosobenzene, 2-fluoro-1,4-dinitrosobenzene, 2-methoxy-1,3-dinitrosobenzene, 5-chloro-1,3-dinitrosobenzene, 2-benzyl-1,4-dinitrosobenzene, and 2-cyclohexyl-1,4-dinitrosobenzene.

Substantially any of the polymeric materials which have been heretofore employed as film formers of film-forming adjuncts in adhesive formulations are suitable for use in the practice of the present invention. Such film-forming polymeric materials include, without limitation, thermosetting condensation polymers, such as thermosetting phenolic resins thermosetting epoxy resins, thermosetting polyester resins, thermosetting triazine resins, and the like; polymers and copolymers of polar ethylenically unsaturated materials, such as poly(vinyl butyral); poly(vinyl formal); poly(vinyl acetate); chlorinated poly(vinyl chloride); copolymers of vinyl acetate and vinyl chloride; chlorinated copolymers of vinyl acetate and vinyl chloride; polymers of acrylic acid; copolymers of acrylic acid and conjugated dienes, such as 1,3-butadiene; 2,chloro-1,3-butadiene; 2,3-dichloro-1,3-butadiene, and the like, and including after-halogenated products thereof; polymers of methacrylic acid; copolymers of methacrylic acid and conjugated dienes; copolymers of vinyl pyridine and conjugated dienes, and including polyvalent reaction products thereof; cellulosic materials such as cellulose acetate butyrate; and the like. Particularly preferred film forming materials are halogen-containing rubbers, including without limitation, chlorinated natural rubber; polychloroprene; chlorinated polychloroprene; chlorinated polybutadiene; chlorinated polyethylene; chlorinated ethylene/propylene copolymers; chlorinated ethylene/propylene/non-conjugated diene terpolymers; chlorinated copolymers of butadiene and styrene; chlorosulfonated polyethylene; brominated poly(2,3-dichloro-1,3-butadiene); copolymers of alpha-chloroacrylonitrile and 2,3-dichloro1,3-butadiene; copolymers of alpha-bromoacrylonitrile and 2,3-dichloro-1,3-butadiene; mixtures of such halogen-containing rubbers with hydrohalogenated rubbers of hypohalogenated rubbers; mixtures of two or more such halogen-containing rubbers and the like. Other suitable polymeric film-forming adjuncts include cellulosic esters such as cellulose acetate butyrate; natural rubber, butyl rubber, ethylene/propylene copolymer(EPM) rubber, ethylene/propylene/diene terpolymer (EPDM) rubber, polymers and copolymers of dienes having from 4 to 12 carbon atoms, such as polybutadiene, and including also copolymers of such dienes and one or more different monomers copolymerizable therewith, such as SBR and butadiene/acrylonitrile rubber. As indicated, halogenated polymeric materials, and particularly chlorinated and brominated rubbers, are preferred film-forming materials in the practice of the invention.

The adhesive compositions of this invention are prepared by conventional means, and such well-known techniques will not be discussed here in detail. As a general rule, the silane-isocyanate adduct and free polyisocyanate will be mixed prior to incorporating any other ingredients, such as aromatic nitroso compound, film-forming polymeric material, filler, and the like. In those instances wherein the adduct has been isolated, the adduct will be added directly to the free polyisocyanate, with both materials, preferably being diluted under conditions such as to ensure a homogeneous mixture. In this instance, the free polyisocyanate can be the same as that used in preparing the adduct, it can be different, or it can comprise a mixture of two or more polyisocyanates, one of which can be, if desired, the same polyisocyanate as was used in forming the adduct. In a second and more preferred instance, the adduct is formed from the reaction of the silane and an excess of polyisocyanate to afford a reaction mixture comprising adduct and free polyisocyanate. In this case, if the amount of free polyisocyanate is insufficient to provide the proper free polyisocyanate: adduct relationship, additional free polyisocyanate can be added to the reaction mixture. Such added free polyisocyanate can, of course, be the same or different from the polyisocyanate employed in forming the adduct, and can include a mixture of two or more polyisocyanates, one of which can be, if desired, the same polyisocyanate as was employed in forming the adduct. As a general rule, it is preferred that the amount of polyisocyanate employed in forming the adduct be such that no additional polyisocyanate need be added to the reaction mixture. The thus-prepared admixture is itself suitable for use as a primer and adhesive composition; or as a base composition into which the aromatic nitroso compounds, film-forming polymeric materials, filler materials such as carbon black and the like, extenders, pigments, diluents, etc., can be incorporated, employing conventional techniques for formulating adhesive compositions.

In forming the adhesive compositions of the present invention, the isocyanatosilane will be present in an amount in the range from about 2.5 to 100, preferably about 2.5 to about 50, and most preferably about 5 to about 40, parts by weight; with the polyisocyanate being present in the amount of 100-x parts by weight, wherein x is equal to the amount, in parts by weight, of isocyanatosilane component. In addition, the isocyanatosilane and free polyisocyanate must provide a minimum amount of total free isocyanate, including that provided by both the isocyanatosilane and free polyisocyanate, equal to one molar equivalent of isocyanate per mol of isocyanatosilane. Preferably, the total free isocyanate content will be in a range from 1 to about 20, preferably 1 to about 12, and most preferably 2 to about 8, molar equivalents per mol of isocyanatosilane. It will be appreciated that the invention affords a great deal of flexibility in preparing adhesive compositions including, inter alia, isocyanatosilane per se; isocyanatosilane and aromatic nitroso compound; isocyanatosilane, aromatic nitroso compound and polymeric film-forming adjunct; isocyanatosilane and free polyisocyanate; isocyanatosilane, free polyisocyanate, and aromatic nitroso compound; isocyanatosilane, free polyisocyanate, aromatic nitroso compound, and polymeric film-forming adjunct; with the compositions comprising isocyanatosilane and free polyisocyanate being particularly preferred. In those compositions containing aromatic nitroso compounds, polymeric film-forming adjuncts, and inert filler, the aromatic nitroso compound will generally be present in an amount in the range from about 5 to about 200, preferably from about 50 to about 150, parts by weight; the polymeric film-forming adjuncts will generally be present in an amount in the range from about 10 to about 200, preferably from about 75 to about 150 parts by weight; and the inert filler will generally be present in an amount in the range from about 10 to about 200, preferably about 25 to about 175, parts by weight; said amounts in each instance being on a basis of 100 parts by combined weight of isocyanatosilane and free polyisocyanate.

As noted previously, in addition to isocyanatosilane, free polyisocyanate, aromatic nitroso compound, polymeric film-forming adjuncts, and inert filler material, the adhesive compositions of the invention can include conventional additives such as pigments, extenders, solvent, diluent, and the like with the amount of such additives being within the range conventionally employed.

For ease of application, as is conventional in this art, the components will be mixed and dispersed in a liquid carrier which, once the composition has been applied, can be readily evaporated. Examples of suitable carriers are aromatic and halogenated aromatic hydrocarbons such as benzene, toluene, xylene, chlorobenzene, dichlorobenzene, and the like; halogenated aliphatic hydrocarbons such as trichloroethylene, perchloroethylene, propylene dichloride, and the like; ketones such as methyl ethyl ketone, methyl isobutyl ketone, and the like; ethers, naphthas, etc., including mixtures of such carriers. The amount of carrier is not critical and will ordinarily be such as to provide a total solids content ranging from about 5 to about 100, i.e., 100 percent solids system, and preferably from about 5 to about 30, percent by weight.

The adhesive compositions of the present invention have been found to be particularly suitable for bonding a wide variety of elastomeric materials, expecially vulcanizable elastomeric materials, to themselves or to other substrates, particularly inorganic substrates. Elastomers which can be bonded include without limitation natural rubber, polychloroprene rubber, styrene-butadiene rubber, nitrile rubber, ethylene/propylene copolymer rubber (EPM); ethylene/propylene/diene terpolymer rubber (EPDM); butyl rubber, polyurethane rubber, and the like. Substrates other than the elastomers per se which can be effectively bonded include fabrics such as fiberglass, polyamides, polyesters, aramids, e.g., Kevlar, a trademark of E. I. du Pont de Nemours & Company, (Inc.), Wilmington, Delaware, and the like; and metals and their alloys such as steel, stainless steel, lead, aluminum, copper, brass, bronze, Monel metals, nickel, zinc, and the like, including treated metals such as phosphatized steel, galvanized steel, and the like; glass; ceramics; and the like.

The adhesive compositions are applied to substrate surfaces in a conventional manner such as by dipping, spraying, brushing, and the like. Preferably, the substrate surfaces are allowed to dry after coating before being brought together. After the surfaces have been joined, the composite structures are heated in a conventional manner to effect curing of the adhesive compositions and simultaneous vulcanization of the uncured elastomer stock.

The following examples are provided for purposes of illustrating the invention, it being understood that the invention is not limited to the examples nor to the specific details therein enumerated. In the examples, amounts are parts by weight unless otherwise specified.

In the several examples, the substrate to which the elastomeric material was bonded was not primed, unless otherwise noted. The composite assembly was cured at conventional conditions of time and temperature for the specific elastomer. The adhesive bond was tested according to ASTM standard D-429, Method B, modified to 45° angle of pull.

The bonded structures are subjected to various tests, including room temperatures (RT) pull, the boiling water test, and the salt spray test. In the RT pull test, the rubber body is peeled from the metal at a 45° angle using a Scott tensile tester and the force required in pounds per inch is recorded. In the boiling water test, bonded samples, after having been scored at the bond line and prestressed by bending the rubber body back from the metal, are immersed in boiling water for two hours; and in the salt spray test, the samples, after scoring the prestressing, are exposed to a spray of salt solution (5% sodium chloride) for 48 hours at 100° F. The samples so treated are tested for relative bond strength by pulling the rubber body from the metal.

In the data given in the Examples, failure is expressed in terms of percent of failure in the rubber body, e.g., 95 R means that 95 percent of the failure occurred in the rubber body, with the remaining failure being between the adhesive composition and the metal, or the like.

EXAMPLE I

A series of adhesive compositions containing isocyanatopropyltriethoxysilane were prepared according to the schedules:

| Adhesive | A-1 | A-2 | A-3 | A-4 |
|---|---|---|---|---|
| Chlorosulfonated polyethylene | 35 | 35 | 35 | 35 |
| Dinitrosobenzene | 30 | 30 | 30 | 30 |
| Carbon black | 40 | 40 | 40 | 40 |
| Isocyanatosilane | — | 15 | 15 | 15 |
| Polymethylene polyphenyleneisocyanate | — | — | 15 | 30 |
| Xylene | 214 | 214 | 214 | 214 |

In forming the compositions, a masterbatch of adhesive A-1 was prepared in a conventional manner. Adhesive formulations A-2, A-3 and A-4 were prepared by blending the respective components into aliquot portions of the masterbatch in a conventional manner.

The thus-formulated adhesive compositions were then coated onto non-primed, grit-blasted, degreased, cold-rolled steel coupons and allowed to dry. The thus-coated steel coupons were placed into contact with a sulfur-vulcanizable natural rubber composition. Each of the assemblies was cured at 307° F for 15 minutes.

Following the vulcanization cycle, the bonded assemblies were tested for environmental resistance according to the boiling water ($\Delta$ H$_2$O) test. The results are reported in the following table:

| Adhesive | Δ H₂O Test Failure |
|---|---|
| A-1 | 0 R (Failed in 1¼ hrs.) |
| A-2 | 26 R |
| A-3 | 59 R |
| A-4 | 64 R |

The foregoing data demonstrate that adhesive formulations containing isocyanatosilane compositions have significantly improved resistance to degradation from attack by environmental conditions.

EXAMPLE II

A reaction vessel, equipped with an agitation means and maintained at room temperature under a nitrogen atmosphere, was charged with 133 g polymethylene polyphenyleneisocyanate having an average isocyanate functionality of 2.7, 532 g trichloroethylene and 0.1 ml dibutyltin dilaurate. The mixture was stirred at room temperature to a uniform consistency. To this mixture there was added, with continouus stirring, 60 g hydroxypropyltrimethoxysilane in 240 g trichloroethylene. This addition was accompanied by an immediate mild exotherm of less than 50° C. When the addition of silane-trichloroethylene was completed, the reaction mixture was stirred for an additional 5 minutes and allowed to cool to room temperature. The reaction mixture was viscous fluid comprising free polymethylene polyphenyleneisocyanate and polymethylene polyphenyleneisocyanate/hydroxypropyltrimethoxysilane adduct having a free isocyanate functionality of about 1.7 and a single silane grouping having the structure

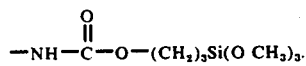

The molar equivalent ratio of total free isocyanate to isocyanatosilane adduct in the reaction mixture was about 2.8:1.

EXAMPLE III

Following the procedure of Example II, to a continuously stirred mixture of 359 g polymethylene polyphenyleneisocyanate (2.7 NCO functionality) and 1436 g trichloroethylene there was added 193 g methylaminopropyltrimethoxysilane in 772 g benzene to afford a viscous fluid reaction mixture comprising free polymethylene polyphenyleneisocyanate and polymethylene polyphenyleneisocyanate/methylaminopropyltrimethoxysilane adduct having a free isocyanate functionality of about 1.7 and a single silane grouping having the structure

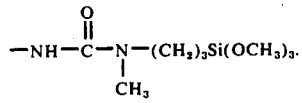

The molar equivalent ratio of total free isocyanate: isocyanatosilane adduct in the reaction mixture was about 2.2:1.

EXAMPLE IV

Following the procedure of Example II, to a continuously stirred mixture of 1000 g polymethylene polyphenyleneisocyanate (2.7 NCO functionality) and 100 g trichloroethylene there was added 179 g aminopropyltrimethoxysilane in 1611 g benzene to afford an amber viscous reaction fluid comprising free polymethylene polyphenyleneisocyanate and polymethylene polyphenyleneisocyanate/g-aminopropyltrimethoxysilane isocyanatosilane adduct having a free isocyanate functionality of 1.7 and a single silane grouping having the structure

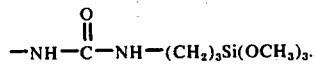

The molar equivalent ratio of total free isocyanate to isocyanatosilane adduct in the reaction mixture was about 8.1:1.

EXAMPLE V

Following the procedure of Example II, 179 g g-aminopropyltriethoxysilane in 1611 g benzene was added to a continuously stirred mixture containing 400 g polymethylene polyphenyleneisocyanate to afford an amber viscous reaction mixture comprising free polymethylene polyphenyleneisocyanate and polymethylene polyphenyleneisocyanate/g-aminopropyltriethoxysilane isocyanatosilane adduct having a free isocyanate functionality of 1.7 and a single silane grouping having the structure

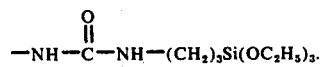

The molar equivalent ratio of total free isocyanate to isocyanatosilane adduct in the reaction mixture was about 2.7:1.

EXAMPLE VI

The reaction product of Example II, comprising isocyanatosilane adduct, free polymethylene polyphenyleneisocyanate and trichloroethylene, without further treatment, was dip-coated onto a fiberglass fabric and allowed to dry for 5 hours. The thus-coated fiberglass fabric was then bonded to a polychloroprene rubber stock of the composition:

|  | Parts by Weight |
|---|---|
| Polychloroprene rubber | 100 |
| Carbon black | 60 |
| Plasticizer | 10 |
| Diurethane of tolylene diisocyanate and nitrosophenol | 6 |
| Polymethylene polyphenyleneisocyanate | 3 |
| Calcium oxide | 4 |

The assembly was cured at 320° F for 20 minutes. The adhesion of the cured assembly was evaluated in accordance with the room temperature pull test, with the following results:

| | | RT Pull | |
|---|---|---|---|
| Run | Coats | Lbs. | Failure |
| 1 | 1 | 70 | 70 R |
| 2 | 2 | 80 | 100 R |

The foregoing data demonstrates that compositions containing at least one isocyanatosilane having free isocyanate functionality and at least one polyisocyanate are effective adhesives for bonding vulcanizable elastomeric materials to a substrate, in this instance, a fiberglass substrate.

EXAMPLE VII

The reaction product of Example IV, comprising isocyanatosilane adduct having free isocyanate functionality, polymethylene polyphenyleneisocyanate, trichloroethylene and benzene, without further treatment, was used to bond non-primed, grit-blased, degreased, cold-rolled steel and fiberglass fabric to a diurethane-vulcanizable nitrile elastomer stock having the composition:

|  | Parts by Weight |
|---|---|
| Butadiene-acrylonitrile rubber | 100 |
| Carbon black | 65 |
| Plasticizer | 20 |
| Diurethane of tolylene diisocyanate & p-nitrosophenol | 6 |
| Polymethylene polyphenyleneisocyanate | 6 |
| Zinc dimethyldithiocarbamate | 2 |

The bonded assemblies were cured at 307° F for 20 minutes. The adhesion of the cured assemblies were evaluated in accordance with the room temperature pull test, with the following results:

| Run | Substrate | Adhesive | Coats | RT Pull Lbs. | Failure |
|---|---|---|---|---|---|
| 1 | Steel | Control[a] | 1 | PBH[b] | 0 R |
| 2 | Steel | Example IV | 1 | 120 SB[c] | 100 R |
| 3 | Steel | Example IV | 1 | 118 SB | 100 R |
| 4 | Steel | Example IV | 2 | 110 SB | 100 R |
| 5 | Steel | Example IV | 2 | 125 SB | 100 R |
| 6 | Fiberglass | Control[a] | 1 | 34 | 50 R |
| 7 | Fiberglass | Control | 1 | 35 | 50 R |
| 8 | Fiberglass | Example IV | 1 | 76 SB | 100 R |
| 9 | Fiberglass | Example IV | 1 | 76 SB | 100 R |
| 10 | Fiberglass | Example IV | 1 | 85 SB | 100 R |
| 11 | Fiberglass | Example IV | 1 | 75 SB | 100 R | a = Polymethylene polyphenyleneisocyanate at 10% in trichlorothlylene.
b = Pulled by hand, no substantial adhesion.
c = Stock break.

The foregoing data demonstrate the effectiveness of compositions containing at least one isocyanatosilane having free isocyanate functionality and at least one free polyisocyanate as adhesive materials for bonding vulcanizable elastomers to substrates such as metals and fibers.

EXAMPLE VIII

Following the procedure of Example II, 179 g g-aminopropyltrimethoxysilane in 716 g benzene was added to a continuously stirred mixture of 750 g polymethylene polyphenyleneisocyanate and 750 g trichloroethylene to afford a viscous fluid reaction mixture comprising isocyanatosilane adduct having free isocyanate functionality and free polymethylene polyphenyleneisocyanate, and having a total free isocyanate: adduct equivalent ratio of about 6.6:1.

The thus-prepared reaction mixture, without further treatment, was used to bond a polyurethane elastomer containing 12.5 PHR (parts by weight per 100 parts by weight of elastomer) 4,4'-methylene-bis-(2-chloroaniline) vulcanizing agent to non-primed, grit-blasted, degreased, cold-rolled steel. For comparison purposes, the polyurethane elastomer stock was bonded to the metal substrates using the following control adhesive:
Polymethylene polyphenyleneisocyanate at 25% in trichloroethylene.

Following the vulcanization cycle, the bonded assemblies were tested according to the room temperature pull test by pulling at room temperature and at 212° F. and tested for environmental resistance according to the salt spray test. The results are reported in the following tables:

Adhesive:
(A) Reaction mixture of Example VIII.
(B) Polymethylene polyphenyleneisocyanate at 25% in trichloroethylene.

TABLE I

| Run | Adhesive | RT Pull Lbs. | Failure |
|---|---|---|---|
| 1 | A | 248 SB | 100 R |
| 2 | A | 270 SB | 100 R |
| 3 | B | 208 SB | 50 R |
| 4 | B | 208 SB | 50 R |

TABLE II

| Run | Adhesive | 212° F. Pull Lbs. | Failure |
|---|---|---|---|
| 5 | A | 168 SB | 100 R |
| 6 | A | 150 SB | 100 R |
| 7 | B | 139 SB | 100 R |
| 8 | B | 186 SB | 100 R |

TABLE III

| Run | Adhesive | Salt Spray After 72 hrs. | Exposure, Failure After 168 hrs. |
|---|---|---|---|
| 9 | A | 90 R | — |
| 10 | A | 90 R | — |
| 11 | B | 75 R | — |
| 12 | B | 75 R | — |
| 13 | A | — | 50 R |
| 14 | A | — | 50 R |
| 15 | B | — | 0 R |
| 16 | B | — | 0 R |

The forgoing data demonstrate that compositions of the present invention provide adhesive compositions which afford not only strong rubber-to-metal bonds but also substantially improve environmental resistance.

EXAMPLE IX

Following the procedure of Example II, 179 g g-aminopropyltrimethoxysilane in 716 g trichloroethylene was added to a continuously stirred mixture of 750 g polymethylene polyphenyleneisocyanate and 750 g trichloroethylene. The reaction mixture was diluted with 200 g trichloroethylene, stirred for an additional 5 minutes and cooled to room temperature. The thus-prepared reaction mixture comprising isocyanatosilane adduct having free isocyanate functionality and free polymethylene polyphenyleneisocyanate and having a total free isocyanate: adduct equivalent ratio of about 6.6:1, without further treatment, was divided into several aliquot portions.

Several of the aliquot portions were employed to prepare adhesive compositions by combining in a conventional manner the following ingredients (parts by weight):

| Adhesive | A | B | C | D |
|---|---|---|---|---|
| Reaction mixture of Example IX | 100 | 100 | 100 | 100 |
| Dinitrosobenzene | — | 10 | 20 | 30 |
| Trichloroethylene | 300 | 325 | 350 | 425 |
| Xylene | — | 17 | 34 | 51 |

The adehesives were employed to bond non-primed, grit-blasted, degreased, cold-rolled steel to sulfur-valcanizable natural and butyl rubber stocks. Following the vulcanization cycle, the bonded assemblies were tested according to the room temperature pull test and for environmental resistance according to the boiling water test ($\Delta H_2O$). The results are reported in the following table:

| Elastomer | Adhesive | RT Pull Lbs. | Failure | $\Delta H_2O$ Failure |
|---|---|---|---|---|
| Natural rubber | A | PBH | 0 R | Not tested |
| Natural rubber | B | 48 | 100 R | 20 R |
|  |  |  |  | 25 R |
| Natural rubber | C | 53 | 100 R | 55 R |
|  |  |  |  | 30 R |
| Natural rubber | D | 51 | 100 R | 70 R |
|  |  |  |  | 70 R |
| Soft natural rubber | A | PBH | 0 R |  |
| Soft natural rubber | B | 32 SB | 100 R |  |
|  |  | 35 SB | 90 R |  |
| Soft natural rubber | C | 30 SB | 100 R |  |
|  |  | 27 SB | 100 R |  |
| Soft natural rubber | D | 33 SB | 100 R |  |
|  |  | 31 | 100 R |  |
| Butyl rubber | A | PBH | 0 R |  |
| Butyl rubber | B | 106 | 100 R |  |
|  |  | 95 | 100 R |  |
|  |  | 88 | 100 R |  |
| Butyl rubber | C | 105 | 100 R |  |
|  |  | 95 | 90 R |  |
| Butyl rubber | D | 90 SB | 90 R |  |
|  |  | 96 | 80 R |  |
|  |  | 94 | 90 R |  |

EXAMPLE X

Several of the aliquot portions of the reaction mixture of Example IX were empolyed to prepare adhesive compositions by combining in a conventional manner the following ingredients (parts by weight):

| Adhesive | B-1 | B-2 | B-3 |
|---|---|---|---|
| Reaction mixture, Example IX | 100 | 100 | 100 |
| Dinitrosobenzene | 30 | 30 | 30 |
| Chlorinated ethylene/propylene/ non-conjugated terpolymer | 35 | — | — |
| Chlorosulfonated polyethylene | — | 35 | — |
| Chloroacrylonitrile/dichlorobutadiene copolymer | — | — | 35 |
| Trichloroethylene | 180 | 495 | 437 |
| Xylene | 256 | 151 | 101 |

The adhesives were employed to bond to non-primed, grit-blasted, degreased, cold-rolled steel sulfur-vulcanizable natural rubber stock. Following the vulcanization cycle, the bonded assemblies were subjected to room temperature pull and boiling water tests with the following results:

| Adhesive | RT Pull Lbs. | Failure | $\Delta H_2O$ Failure |
|---|---|---|---|
| B-1 | 53 | 100 R | 100 R |
|  |  |  | 100 R |
| B-2 | 54 | 100 R | 100 R |
|  |  |  | 100 R |
| B-3 | 46 | 100 R | 100 R |

| Adhesive | RT Pull Lbs. | Failure | $\Delta H_2O$ Failure |
|---|---|---|---|
|  |  |  | 100 R |

EXAMPLE XI

Following the procedure of Example II, to a continuously stirred mixture of 750 g polymethylene polyphenyleneisocyanate and 3000 g trichloroethylene there was added 179 g g-aminopropyltrimethoxysilane in 716 g trichloroethylene to afford a reaction mixture comprising free polymethylene polyphenyleneisocyanate and polymethylene polyphenyleneisocyanate/g-aminopropyltrimethoxysilane having a free isocyanate functionality of 1.7 and a single silane gouuping. The equivalent ratio of total free isocyanate to adduct in the reaction mixture was about 6.6:1.

The reaction mixture was separated into several portions and adhesive compositions having a total solids content (TSC) of about 20 weight percent were prepared as follows, the amounts being parts by weight:

|  | Parts by Weight | | | |
|---|---|---|---|---|
|  | C-1 | C-2 | C-3 | C-4 |
| Reaction mixture, Example XI | 100 | 100 | 100 | 100 |
| Dinitrosobenzene | 30 | 30 | 30 | 30 |
| Chlorinated ethylene/propylene/ non-conjugated diene terpolymer | 35 | — | — | — |
| Chlorosulfonated polyethylene | — | 35 | — | — |
| Chloroacrylonitrile/dichlorobutadiene copolymer | — | — | 35 | — |
| Trichloroethylene | 400 | 400 | 400 | 400 |
| Xylene | 260 | 260 | 472 | 120 |

Each adhesive was maintained at room temperature for an extended period and viscosity measurements (Brookfield Viscometer, No. 2 spindle at 30 RPM) were made with the following results:

| Adhesive | C-1 | C-2 | C-3 | C-4 |
|---|---|---|---|---|
| Time | Viscosity, CPS | | | |
| Initial | 38 | 282 | 290 | 60 |
| 1 week | 75 | 286 | 292 | 160 |
| 2 weeks | 78 | 320 | 236 | 76 |
| 3 weeks | 75 | 303 | 192 | 75 |
| 6 weeks | 85 | 360 | 370 | 80 |

The foregoing data demonstrates the excellent ambient temperature storage stability of the herein described adhesive compositions.

EXAMPLE XII

Following the procedure of Example II, 179 g g-aminopropyltrimethoxysilane in 385 g xylene and 358 g trichloroethylene was added to a continuously stirred mixture of 750 g polymethylene polyphenleneisocyanate, 1500 g xylene and 1500 g trichloroethylene to afford a viscous reaction mixture comprising isocyanatosilane adduct having free isocyanate functionality and free polymethylene polyphenyleneisocyanate, and having a total free isocyanate: adduct equivalent ratio of about 6.6:1.

The thus-prepared reaction mixture, without further treatment was employed to prepare adhesive compositions having a total solids content of about 15 weight percent as follows, amounts being in parts by weight:

| Adhesive | D-1 | D-2 | D-3 | D-4 | D-5 |
|---|---|---|---|---|---|
| Reaction mixture, Example XII | 100 | 100 | 100 | 100 | 100 |
| Dinitrosobenzene | 30 | 30 | 30 | 30 | 30 |
| Chlorosulfonated polyethylene | — | 35 | — | — | — |
| Chloroacrylonitrile/dichloro-butadiene copolymer | — | — | 35 | — | — |
| Chlorinated ethylene/propylene/nonconjugated diene terpolymer | — | — | — | 35 | — |
| Cellulose acetate butyrate | — | — | — | — | 35 |
| Xylene | 330 | 220 | 220 | 168 | 337 |
| Trichloroethylene | 400 | 715 | 715 | 777 | 598 |

Samples of each adhesive formulation were maintained at room temperature and 130° F for an extended period and vicosity measurements periodically taken with the following results:

| | Adhesive | | | | | | | | | |
|---|---|---|---|---|---|---|---|---|---|---|
| | Viscosity, cps | | | | | | | | | |
| | D-1 | | D-2 | | D-3 | | D-4 | | D-5 | |
| Time: | RT | 130° F | RT | 130° F | RT | 130° F | RT | 130° F | RT | 130° F |
| Initial | 35 | 35 | 70 | 70 | 115 | 115 | 90 | 90 | 140 | 140 |
| 1 week | — | 46 | — | 179 | — | 178 | — | 180 | Paste | Paste |
| 2 weeks | — | 62 | — | 160 | — | 112 | — | 44 | | |
| 3 weeks | — | 92 | — | 190 | — | 80 | — | 30 | | |
| 4 weeks | 20 | 190 | 68 | 230 | 130 | 165 | 40 | 30 | | |
| 5 weeks | 25 | 350 | 75 | 172 | 135 | 70 | 55 | 25 | | |
| 6 weeks | — | 408 | — | 138 | — | 2300 | — | 45 | | |
| 7 weeks | — | 850 | — | 170 | — | Paste | — | 25 | | |
| 8 weeks | — | Paste | — | >1000 | — | 355 | — | 25 | | |
| 9 weeks | — | Paste | — | 1975 | — | 550 | — | 30 | | |

EXAMPLE XIII

A series of adhesive formulations were prepared by combining in a conventional manner the following ingredients (parts by weight):

| Adhesive | E-1 | E-2 | E-3 |
|---|---|---|---|
| Chlorosulfonated polyethylene | 35 | 35 | 35 |
| Dinitrosobenzene | 30 | 30 | 30 |
| Polymethylene polyphenyleneisocyanate | 40 | — | 42 |
| g-Aminopropyltriethoxysilane | — | 10 | — |
| Isocyanatosilane (polymethylene polyphenyleneisocyanate/g-Aminopropyltriethoxysilane adduct) | — | — | 8 |
| Trichloroethylene/xylene at 50% | 600 | 600 | 600 |

The adhesives were employed to bond sulfur-vulcanizable natural rubber to non-primed, grit-blasted, degreased, cold-rolled steel. Following the vulcanization cycle, the bonded assemblies were subjected to room temperature pull and boiling water tests with the following results:

| | RT Pull | | Δ H₂O |
|---|---|---|---|
| Adhesive | Lbs. | Failure | Failure |
| E-1 | 40 | 45 R | 0 R (within 10 sec.) |
| E-2 | 50 | 0 R | 0 R (within 10 sec.) |
| E-3 | 43 | 100 R | 100 R (after 2 hrs.) |
| | | | 100 R (after 6 hrs.) |

The foregoing data is a comparison of adhesive compositions prepared in accordance with this invention versus adhesive compositions containing the starting materials employed to form isocyanatosilane compositions. The data are self-explanatory.

EXAMPLE XIV

Isocyanatosilane adducts were prepared according to the procedure of Example II from g-aminopropyltriethoxysilane and tolylene diisocyanate, methylene-bis(-phenyl isocyanate) and methylene-bis(cyclohexylisocyanate), respectively. The reaction mixtures in each instance were employed without further treatment to form adhesive compositions containing chlorosulfonated polyethlene, dinitrosobenzene and carbon black. The thus prepared adhesive compositions were effective for bonding sulfur-vulcanizable natural rubber stocks to steel substrates, and also formed bonded rubber-to-metal assemblies that were resistant to environmental conditions.

What is claimed is:
1. An isocyanatosilane characterized by the presence of at least one reactive isocyanate group and containing a single silane grouping having the structure

said reactive isocyanate group being connected to said silane grouping through a divalent organic radical having at least one carbon atom, and wherein
R is a divalent aliphatic, cycloaliphatic or aromatic radical having from 1 to 20 carbon atoms;
R¹ is a monovalent aliphatic, cycloaliphatic or aromatic radical having from 1 to 20 carbon atoms;
R² is a monovalent aliphatic, cycloaliphatic or aromatic organic radical having from 1 to 8 carbon atoms; and
a is zero or 1.
2. An isocyanatosilane compound in accordance with claim 1 wherein R is an alkylene radical having from 1 to 9 carbon atoms; R¹ is selected from the group consisting of alkyl radicals having from 1 to 4 carbon atoms, cycloalkyl radicals having from 4 to 7 ring carbon atoms, and aryl radicals having 6, 10, or 14 nuclear carbon atoms; and R² is selected from the group consisting of alkyl radicals having from 1 to 4 carbon atoms, — R³ — O — R⁴, and

where $R^3$ is an alkylene group having from 1 to 4 carbon atoms and $R^4$ is an alkyl group having from 1 to 4 carbon atoms.

3. An isocyanatosilane compound in accordance with claim 2 wherein $a$ is zero.

4. An isocyanatosilane compound in accordance with claim 1 which is the reaction product of a polyisocyanate and a primary aminoorganosilane reactant.

5. An isocyanatosilane compound in accordance with claim 2 which is the reaction product of a polyisocyanate and a primary aminoorganosilane reactant.

6. An isocyanatosilane compound in accordance with claim 5 wherein said polyisocyanate has the structural formula

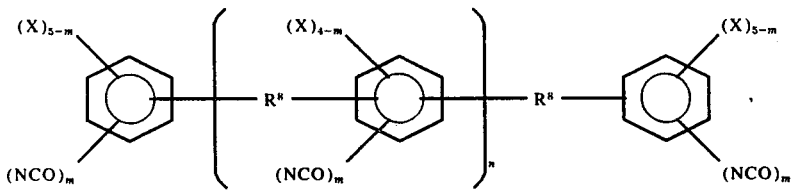

wherein $R^8$ is a divalent organic radical having from 1 to 8 carbon atoms; $m$ is 1 or 2; $n$ is a digit having an average value in the range from zero to 15; and X is selected from the group consisting of hydrogen, halogen, alkyl radicals having from 1 to 8 carbon atoms, and alkoxy radicals having from 1 to 8 carbon atoms.

7. An isocyanatosilane according to claim 6 wherein said aminoorganosilane reactant has the formula

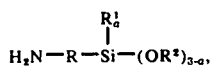

wherein R, $R^1$, $R^2$ and $a$ are as previously defined.

8. An isocyanatosilane according to claim 7 wherein $R^8$ is methylene, X is hydrogen, $m$ is 1 and $n$ has an average value in the range from about 0.1 to about 4.

9. An isocyanatosilane according to claim 8 wherein R is an alkylene radical having from 1 to 9 carbon atoms; $R^1$ is selected from the group consisting of alkyl radicals having from 1 to 4 carbon atoms, cycloalkyl radicals having from 4 to 7 ring carbon atoms, and aryl radicals having 6, 10 or 14 nuclear carbon atoms; and $R^2$ is selected from the group consisting of alkyl radicals having from 1 to 4 carbon atoms, $-R^3-O-R^4$, and

where $R^3$ is an alkylene group having from 1 to 4 carbon atoms and $R^4$ is an alkyl group having from 1 to 4 carbon atoms.

10. An isocyanatosilane according to claim 9 wherein R is propylene, $R^2$ is methyl, and $a$ is zero.

11. An isocyanatosilane according to claim 9 wherein R is propylene, $R^2$ is ethyl, and $a$ is zero.

12. An isocyanatosilane according to claim 9 wherein R is propylene, $R^2$ is $-CH_2CH_2-O-CH_3$, and $a$ is zero.

13. An isocyanatosilane according to claim 9 wherein R is propylene, $R^2$ is

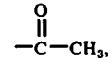

and $a$ is zero.

* * * * *